United States Patent
Perez

(10) Patent No.: US 7,328,436 B2
(45) Date of Patent: Feb. 5, 2008

(54) DYNAMIC ALLOCATION OF INTERNAL MEMORY AT RUNTIME

(75) Inventor: Ricardo Martinez Perez, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 800 days.

(21) Appl. No.: 10/662,690

(22) Filed: Sep. 15, 2003

(65) Prior Publication Data
US 2005/0060510 A1    Mar. 17, 2005

(51) Int. Cl.
*G06F 9/45* (2006.01)
(52) U.S. Cl. .................................... 717/178
(58) Field of Classification Search ............. 717/170, 717/178
See application file for complete search history.

(56) References Cited

U.S. PATENT DOCUMENTS

| | | | |
|---|---|---|---|
| 6,151,703 A * | 11/2000 | Crelier | 717/136 |
| 6,684,393 B1 * | 1/2004 | Loen et al. | 717/151 |
| 6,748,591 B1 * | 6/2004 | Lewallen | 717/170 |
| 7,127,709 B2 * | 10/2006 | Demsey et al. | 717/148 |
| 2002/0103942 A1 * | 8/2002 | Comeau | 709/321 |
| 2002/0194191 A1 * | 12/2002 | Sexton et al. | 707/102 |
| 2004/0220998 A1 * | 11/2004 | Shenfield et al. | 709/201 |
| 2004/0243989 A1 * | 12/2004 | Owens et al. | 717/151 |

* cited by examiner

*Primary Examiner*—John Chavis

(57) ABSTRACT

The invention provides a method of allocating memory in a wireless communication system. The method includes the steps of loading an application into a wireless communication device, compiling at least a portion of the application into native instructions, determining a runtime sensitivity of the native instructions, determining availability of internal memory, and inserting at least a portion of the native instructions into the internal memory at runtime based on the determined availability of internal memory and the runtime sensitivity determination. An associated computer usable medium and a wireless communication device are disclosed.

32 Claims, 3 Drawing Sheets

DYNAMIC ALLOCATION OF INTERNAL MEMORY AT RUNTIME

FIELD OF THE INVENTION

This invention relates generally to operating systems for wireless communication devices. More specifically, the invention relates to dynamic allocation of processor memory for applications at runtime.

BACKGROUND OF THE INVENTION

Object-oriented programming (OOP) has become popular in recent years because it facilitates code reuse, code sharing and the reduction of dependencies among different software. Java™, one of the most popular object-oriented languages, is often used for Internet applications, in large part because of its relative platform independence. Nevertheless, Java™ applications, like those of other object-oriented languages, may execute significantly slower than an application written in other programming languages such as C. One of the challenges for programmers is how to minimize the decrease in computing speed that typically occurs with memory allocations and de-allocations in OOP.

A Java™ program is comprised of numerous Java™ classes, which are compiled into machine-independent bytecode class files. Each class contains code and data in a platform-independent class file format. A computer system containing an interpretive program called a Java™ Virtual Machine (JVM) executes the code in the Java™ classes, which provides a level of abstraction between the bytecode classes and an instruction set of the computer hardware. A class loader within the JVM loads the bytecode class files as needed, and either an interpreter executes the bytecodes directly, or a "just-in-time" (JIT) compiler translates the bytecodes into native machine code so that the code can be executed by the processor.

Java™ and other object-oriented programming languages are attractive for programming various web-enabled wireless devices such as personal digital assistants and mobile phones. For these devices having limited memory and power, efficient use of memory becomes critical to their performance. Many commercially available wireless communication devices employ processes that statically assign certain algorithms at compile time to the fastest memory of the devices, which may lead to reducing the total amount of code that can be run from limited-size, high-speed internal random-access memory (IRAM), also referred to as cache memory.

In an exemplary mobile phone, the baseband processor internal memory used by the radio operating system has inefficiencies. This is because all code that is assigned to run from IRAM is statically linked, while other time-sensitive code cannot use the fastest processing memory, even when the code currently using the fast memory does not need to execute. For example, if the internal memory is 64 kilobytes in size, only 64 kilobytes worth of statically assigned code can use the fastest memory and the code may include unneeded functions. The Java™-run wireless device in this particular case employs a JIT compiler to generate native code from Java™ bytecode.

When a JIT compiler is used in a wireless device to generate and pre-compile native code, the native code may actually run slower than the original Java bytecode from the JVM when code is executed from flash rather than internal memory, resulting in a decrease in performance. Thus, an increase in the run-time speed of mobile information device applets (MIDlets), i.e. small Java™ applications used in mobile devices, would improve the overall performance of a device. In addition, any methods or processes that make Java™ compilations more efficient in mobile devices could also benefit non-Java™ applications such as screen refresh rates for an application programming interface (API) of a digital camera or a liquid-crystal display (LCD) display driver.

Therefore, the need still exists for a method that improves the performance speed of operating systems found in wireless communication devices such as mobile phones. The improved method and associated wireless device would be able to effectively load and execute the most critical code in the fast internal memory available at application run time, resulting in increased run-time speed and performance of a device, as well as overcoming the limitations described above.

SUMMARY OF THE INVENTION

One aspect of the invention provides a method of allocating memory in a wireless communication system. An application is loaded into a wireless communication device and at least a portion of the application is compiled into native instructions. The runtime sensitivity of the native instructions and the availability of internal memory are determined, and at least a portion of the native instructions is inserted into the internal memory at runtime based on the determined availability of the internal memory and the determined runtime sensitivity.

Another aspect of the invention provides a computer usable medium including a program to allocate memory in a wireless communication system. The program includes computer program code to load an application into a wireless communication device; to compile at least a portion of the application into native instructions; to determine a runtime sensitivity of the native instructions; to determine availability of internal memory; and to insert at least a portion of the native instructions into the internal memory at runtime based on the determined availability of internal memory and the determined runtime sensitivity.

Another aspect of the invention provides a wireless communication device, including means for loading an application into the wireless communication device, means for compiling at least a portion of the application into native instructions, means for determining a runtime sensitivity of the native instructions, means for determining availability of internal memory, and means for inserting at least a portion of the native instructions into the internal memory at runtime based on the internal memory and runtime sensitivity determinations.

The present invention is illustrated by the accompanying drawings of various embodiments and the detailed description given below. The drawings should not be taken to limit the invention to the specific embodiments, but are for explanation and understanding. The detailed description and drawings are merely illustrative of the invention rather than limiting, the scope of the invention being defined by the appended claims and equivalents thereof. The foregoing aspects and other attendant advantages of the present invention will become more readily appreciated by the detailed description taken in conjunction with the accompanying drawings.

DETAILED DESCRIPTION OF THE PRESENTLY PREFERRED EMBODIMENTS

Figure 1:
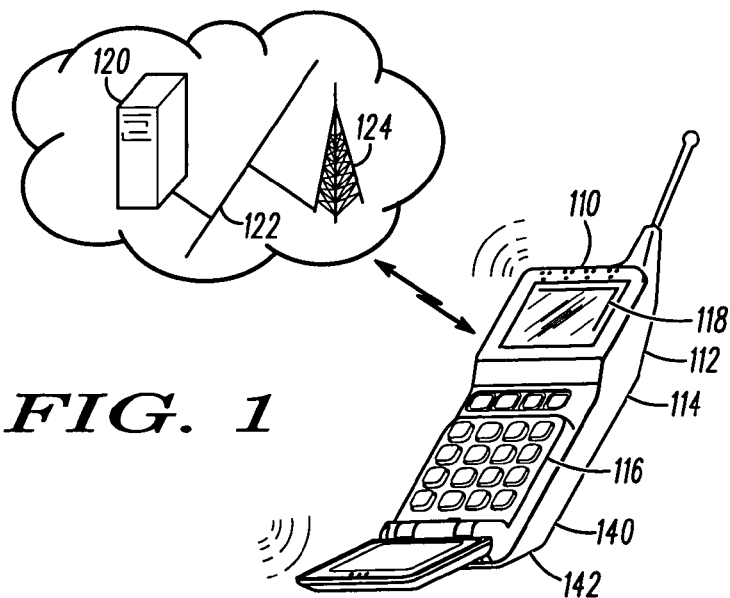
FIG. 1 illustrates a wireless communication device, in accordance with one embodiment of the current invention.

FIG. 1 illustrates a wireless communication device, in accordance with one embodiment of the present invention at 100. Wireless communication device 110 includes a radio operating system 112 for loading applications into wireless communication device 110 and to compile, interpret and execute the applications that often include high-level object-oriented source code such as Java™.

Applications may be downloaded, for example, from an application server 120 connected via a combination of wired and wireless networks 122 to a broadcast antenna 124 for transmission to wireless communication device 110. Previously stored applications may be loaded from memory 140 within wireless communication device 110, uploaded from a memory device electrically connected to wireless communication device 110, or transferred to wireless communication device 110 from another electronic device such as a portable MP3 player, a laptop, or a personal digital assistant (PDA) using a wireless transceiver 114 within wireless communication device 110.

Because high-speed internal memory is often limited within wireless communication device 110, runtime sensitivity can occur when running one or more applications. Runtime sensitivity is defined as the ability to execute application instructions in a timely manner within the wireless communication device. Applications with low runtime sensitivity may show little or no effect to the user. Applications with high runtime sensitivity may show apparent runtime difficulties such as broken video feeds, disrupted voice communications, gaps in music, or slow response to manually inputted commands. Improvements to running speed of applications loaded into wireless communication device 110 may be made by dynamically allocating portions of the compiled applications at runtime to high-speed internal random-access memory 142. Applications may be launched, for example, from an input device 116 such as a keypad or a voice-recognition system. An output device 118 such as a display or audio system may be used for visual and audio output, for example, while one or more applications are running.

Figure 2:
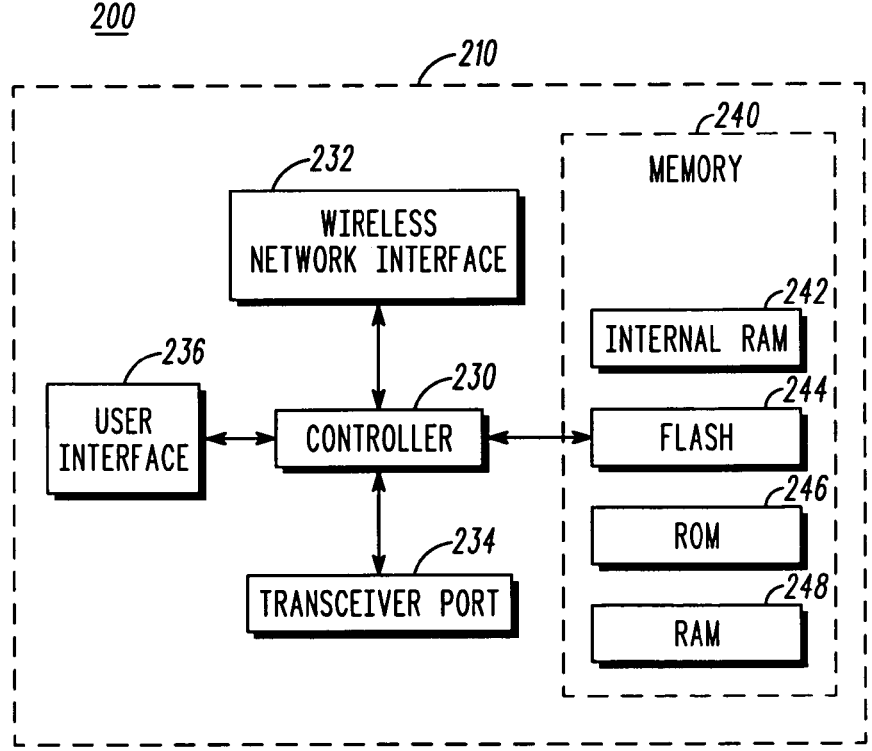
FIG. 2 is a block diagram of a system for allocating memory in a wireless communication device.

FIG. 2 shows a block diagram of a system for allocating memory in a wireless communication device, in accordance with one embodiment of the present invention at 200. Memory allocation system 200 located in a wireless communication device 210 includes a controller 230 and memory 240.

Controller 230 is electrically connected to memory 240, which includes a combination of high-speed internal random-access memory (IRAM) 242, a non-volatile, electrically writable memory such as flash memory 244, read-only memory (ROM) 246, and additional random-access memory 248. Internal random-access memory 242, sometimes referred to as processor memory, internal memory, cache memory or cache, may comprise a subset of the cache called a pseudo-cache that may change in size and location as applications are run and completed. Other memory storage devices such as magnetic media, compact discs (CD), and digital versatile discs (DVD) may also be connected to controller 230. Controller 230 obtains and executes microcode that contains instructions for operating wireless communication device 210. For example, at least a portion of the radio operating system for wireless communication device 210 is located within flash memory 244 and read-only memory 246.

Controller 230 is electrically connected to a wireless network interface 232 such as a cellular phone network. Data packets, messages, files, attachments, applications, and other voice and data may be sent from and received by wireless communication device 210. For example, wireless network interface 232 is capable of sending to and receiving transmissions from communication systems using Global System for Mobile Communication (GSM), Code Division Multiple Access (CDMA), Time Division Multiple Access (TDMA) or other standard communication technologies. For short-range communication, controller 230 may be electrically connected to a transceiver port 234 for transmitting and receiving Bluetooth™, IEEE 802.11a, IEEE 802.11b or IEEE 802.11g transmissions or other suitable wired or wireless communication protocol.

Controller 230 is connected to a user interface 236 between controller 230 and an input device or output device such as a keypad, a voice recognition device, a display, an audio speaker, a serial port, a parallel port, an input-output port, a digital camera, or an MP3 player.

Applications may be loaded into wireless communication device 210 at runtime by downloading, for example, an application from a server or website through wireless network interface 232 or through transceiver port 234. Alternatively, applications may be downloaded and stored in flash memory 244 for immediate or future execution. Applications may also be preloaded into flash memory 244 or ROM 246 during the manufacturing of wireless communication device 210. Controller 230, in conjunction with a compiler stored in memory 240, may be used to compile the applications or portions thereof into native instructions and to determine the runtime sensitivity of the native instructions.

By executing program code, controller 230 may determine the availability of internal random-access memory 242. The native instructions may be stored in high-speed internal random-access memory 242 or in slower memory such as flash memory 244 or random-access memory 248. Based on the determinations of runtime sensitivity and internal memory availability, some or all of the native instructions can be inserted into the internal memory by copying or moving the relevant code. De-referencing code, which allows an application loader to insert at least a portion of the compiled application into internal memory, may be added to the compiled application. A de-referencing table, which also may be constructed and attached to the compiled application, includes memory location information and memory size information associated with the portion of the native instructions inserted into internal random-access memory 242. In addition, a pseudo-cache table, which includes memory location and size information associated with the native instructions inserted into the internal memory, may be updated. A pseudo-cache location indicator, which may be updated in the pseudo-cache table, includes an address of an available pseudo cache allocated to the insertion of the native instructions at runtime. Similarly, controller 230 may update a pseudo-cache size indicator including the number of bytes available in the pseudo cache.

Controller 230 executes compiled applications stored in memory 240. Some applications may be run continuously, while others may be run occasionally or only once. User input to initiate or interact with the applications is received through user interface 236 or via transceiver port 234. When compiled applications have been executed, internal random-access memory 242 may be relinquished to free up the high-speed memory for other purposes.

Memory 240 can be dynamically allocated at runtime by executing code pertaining thereto, using one of many commercially available controllers 230 and memory 240.

Figure 3:
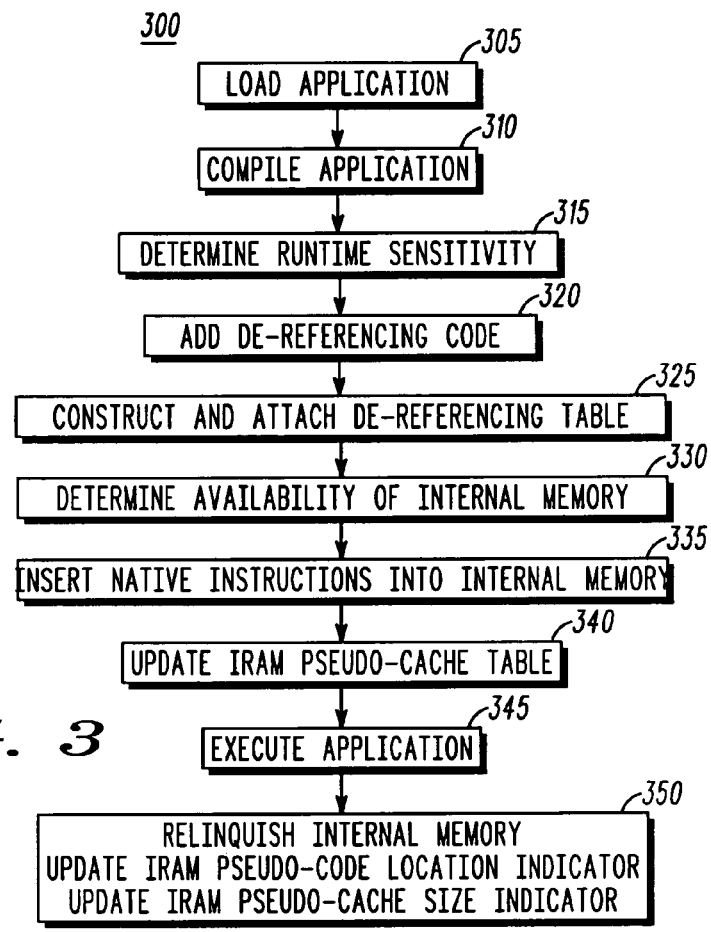
FIG. 3 is a flow diagram of a method for allocating memory in a wireless communication system, in accordance with one embodiment of the current invention.

FIG. 3 shows a flow diagram of a method for allocating memory in a wireless communication system, in accordance with one embodiment of the present invention at 300. Memory allocation method 300 includes steps to load and compile applications, to determine runtime sensitivity and internal memory availability at runtime, and to insert some or all of the compiled application into the internal memory based on the memory availability and the runtime sensitivity. The internal memory is a high-speed memory closely coupled to the controller that comprises, for example, an internal random-access cache memory. The method allows a Java™ loader application to effectively execute JIT-generated native instructions and Java™ code from the fastest memory available at application runtime. Alternatively, the method allows applications with other object-oriented programming languages and applications such as binary runtime environment for wireless (BREW™) applications to be allocated into internal memory at runtime.

An application is installed or loaded into a wireless communication device, as seen at block 305. The application, such as a digital camera viewer, a moving-pictures-experts-group layer-three (MP3) selector and player, a navigational aid, a browser window, a phone directory, or an operation selector, can be downloaded into the wireless communication device from, for example, an application server via a combination of wired and wireless networks using a standard communication protocol. Alternatively, applications may be loaded from a memory storage device within or connected to the wireless communication device such as a compact disc (CD), digital versatile disc (DVD), MP3 player, a magnetic media, an optical media, a solid-state memory, or from a digital device electrically connected to the wireless communication device. The application may comprise, for example, a Java application with at least one Java class, each Java class including at least one bytecode.

While the application is loading, the application may be compiled, as seen at block 310. During compilation, instructions associated with the application are translated into native code that is executable by the processor or controller within the wireless communication device. For example, JIT compiler is used to generate a combination of bytecodes and native instructions. The application is passed through the JIT compiler to compile at least a portion of the application into native instructions. The resulting relocatable code may be executed directly by the controller when called at runtime. Alternatively, the resulting code with a combination of bytecodes and native instructions may be run through an interpreter, such as a JVM, at runtime to generate native code specific to higher-level commands. The compiler may be adapted to detect runtime sensitivity of the native instructions. The adapted compiler allows for dynamic memory allocation that is capable of on-the-fly adaptation of the compiled code at runtime. Applications that require the fastest performance may be dynamically loaded by the radio operating system upon startup to the best combination of available memory pools.

As the application is compiled, the compiler determines runtime sensitivity, as seen at block 315. Determining the runtime sensitivity may comprise, for example, detecting a memory attribute code. When the application is written, an attribute associated with a Java class may be assigned by the developer and embedded in the coding to indicate that one or more commands have extensive memory addressing requirements or a memory runtime sensitivity, and that runtime speed would be reduced when native code associated with these commands are placed in high-speed IRAM. A predefined flag indicating the memory sensitivity may be set or enabled to mark the sensitive code. In another example, determining the runtime sensitivity comprises analyzing a bytecode for memory addressing requirements and marking the analyzed bytecodes for insertion into high-speed IRAM when the memory addressing requirements are extensive. In another example, an assessment of runtime sensitivity may be made and a priority indicator assigned to various commands or blocks of commands that indicates priority for insertion into the high-speed IRAM at runtime.

De-referencing code is added to the compiled application, as seen at block 320. The de-referencing code includes computer program code that allows an application loader to insert a portion of the compiled application into the available internal memory prior to executing the application. The application loader may be part of, for example, a Java application manager (JAM).

A de-referencing table may be constructed and attached to the compiled application, as seen at block 325. The de-referencing table includes memory location information and memory size information associated with the portion of the native instructions that is inserted into the internal memory prior to executing the application. At application load time, one or more MIDlets may be loaded into the fastest memory available first based on the amount of internal memory available. The de-referencing table may include, for example, additional information to dynamically link Java methods just before execution.

A determination of the internal memory availability is made, as seen at block 330. The IRAM availability is determined in part by the size of the internal memory and the amount of the internal memory available at runtime for the insertion of at least a portion of the native instructions into the internal memory. For example, the IRAM availability may be determined by reading an internal memory pseudo-cache size indicator that includes the number of bytes available in a pseudo cache. An internal memory pseudo-cache location indicator may be read to determine, for example, the location of an address of the first available pseudo-cache memory location. The location and amount of IRAM available at runtime is dependent, for example, on other applications, code, and data that are currently running or currently stored in the IRAM. In some cases, the available IRAM may be large enough to store all the bytecode and native instructions related to the application. In other applications, the available IRAM may be zero or too small to accommodate any significant portion of the compiled application, which may then be run from the flash memory or wherever the compiled application has been stored.

At least a portion of the native instructions is inserted into the internal memory at runtime based on the determined availability of internal memory and the runtime sensitivity of the native instructions, as seen at block 335. Inserting the native instructions into the internal memory may comprise copying a set of instructions associated with the application from flash memory to the IRAM. When inserted into the IRAM, the application may run faster due to fewer clock cycles needed to access and retrieve or store data or other instructions in the IRAM. Insertion of the native instructions into the internal memory may be done, for example, in contiguous blocks on a first-come, first-served basis.

An internal memory pseudo-cache table is updated, as seen at block 340. The pseudo-cache table includes memory location information and memory size information associated with the portion of the native instructions inserted into the internal memory. The pseudo-cache table may be generated at installation time based on the available IRAM pseudo-cache size and the number of algorithms, functions, or methods that can fit into the IRAM. For example, when a MIDlet is started, the loader may copy or insert the marked code into the IRAM with a copy call routine. After the marked code is loaded, initialization can continue.

The application is executed, as seen at block 345. The application may be executed, for example, with the JIT-compiled code or by interpreting the code with a virtual machine such as a JVM.

When the application has executed, the internal memory with the inserted native instructions is relinquished, as seen at block 350. The relinquished internal memory becomes available for use, for example, by another application. For example, the pseudo-cache table may be cleared so that the next time a MIDlet launches it can use the memory. The pseudo-cache location indicator including an address of the available pseudo cache allocated to the inserting of the native instructions at runtime may be updated. The pseudo-cache size indicator with the number of available bytes in the pseudo cache may be updated.

Although the addition of indirection may add several clock cycles of overhead into compiled applications that insert instructions into the IRAM, running the methods from internal memory often requires no wait states, e.g. one clock cycle per memory access.

The computer program code to allocate memory in the wireless communication device may be stored in flash, ROM, or other computer usable medium within the wireless communication device. For installing or loading into the wireless communication device, the computer program code may be stored on a CD, DVD, magnetic media, electronic memory, or on any suitable computer usable medium.

Figure 4:
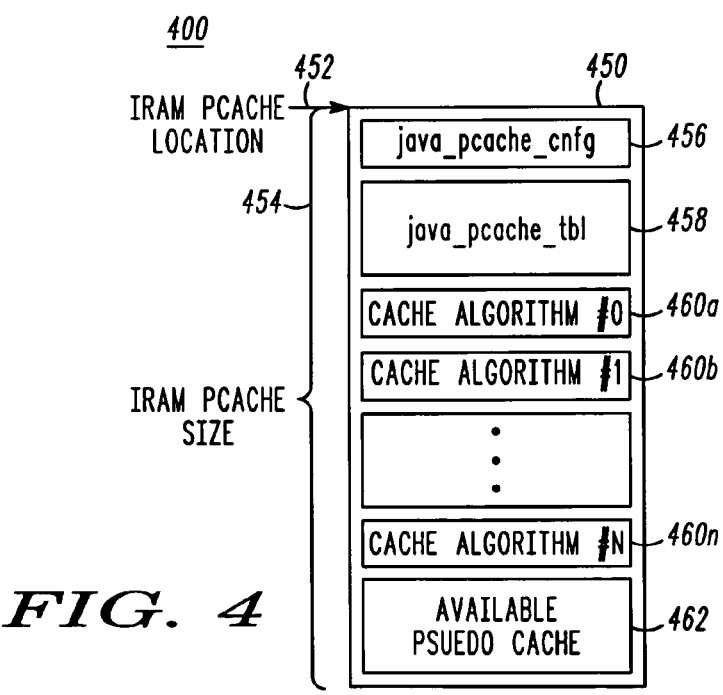
FIG. 4 illustrates a pseudo cache including a pseudo-cache table, one or more cached algorithms, and available internal memory, in accordance with one embodiment of the current invention.

FIG. 4 illustrates a partially filled pseudo cache including a pseudo-cache table, one or more cached algorithms, and available internal memory, in accordance with one embodiment of the current invention at 400. Pseudo cache 450 is contained in one or more sections of internal memory allocated for high-speed use. The first address of pseudo cache 450 may be indicated by an IRAM pseudo-cache location 452. The size of pseudo cache 450 is indicated, for example, by an IRAM pseudo-cache size 454. Pseudo cache 450 includes a pseudo-cache structure block 456 that provides configuration information for the configured pseudo cache 450 such as start locations; available code in pseudo cache 450; the number of algorithms, functions or methods; and the amount of native code within the pseudo cache. At startup a MIDlet may create a data structure for each algorithm, function, or method that will be loaded into IRAM instead of flash memory, which provides indirection for each algorithm, function, or method.

Pseudo-cache table 458 includes memory location information and memory size information associated with the portion of the native instructions inserted into the internal memory. Pseudo-cache table 458 may have one entry for each cached algorithm. In one example, each entry in pseudo-cache table 458 includes twelve bytes containing assembly instructions and necessary data to perform indirect jumps into the appropriate algorithm.

Cached algorithms 460*a*, 460*b*, 460*n* and others in between represent algorithms, methods, functions or native code within partially filled pseudo cache 450. In this example, an available portion 462 of pseudo cache 450 is available for further use by other applications or for use by subsequent applications that require more high-speed IRAM. In some cases, a pre-compiled algorithm that is marked for insertion into IRAM may not fit into the available IRAM at runtime. In these cases, the pseudo-cache table entry may exist, yet the address field of the table data structure may point to a memory address in the flash memory rather than to a memory address in the IRAM.

At the end of each algorithm, the contents of the program counter register may be read in and then a jump command to the address indicated by the program counter can be executed to return and continue execution of other algorithms.

Figure 5:
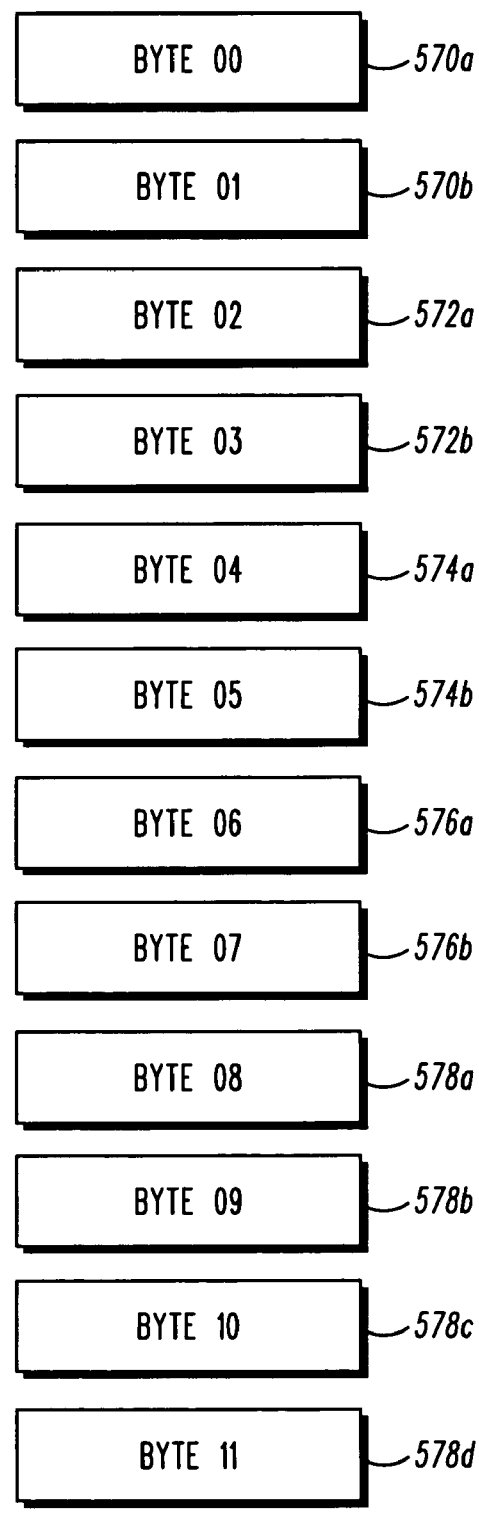
FIG. 5 illustrates a pseudo-cache table entry, in accordance with one embodiment of the current invention.

FIG. 5 illustrates a pseudo-cache table entry, in accordance with one embodiment of the present invention at 500. Pseudo-cache table entry 500 includes a block of twelve bytes containing assembly instructions and necessary data to perform an indirect jump to the appropriate algorithm. Bytes 570*a* and 570*b* contain an assembly or native instruction such as subi r0,4 that directs the controller to subtract four bytes from a stack point. Bytes 572*a* and 572*b* contain an assembly or native instruction such as st r15, (r0,0) to store a pointer into register 15. Bytes 574*a* and 574*b* contain an assembly or native instruction, such as Id.w r15 (r15, 4), that assigns an address located at byte08, byte09, byte10 and byte11 of pseudo-cache table entry 500 to the program counter in register 15, which forces a jump to the appropriate algorithm, function, or method. Bytes 576*a* and 576*b* are reserved, and bytes 578*a*, 578*b*, 578*c* and 578*d* contain the 32-bit address of the algorithm, function, or method. This address is the location in internal random-access memory where the algorithm starts. Instead of the actual address, an offset from the beginning of the table may be used to allow the pseudo-cache table to reside anywhere and be built during installation.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of allocating memory in a wireless communication system, comprising:
   loading an application into a wireless communication device;
   compiling at least a portion of the application into native instructions;
   determining a runtime sensitivity of the native instructions;
   determining availability of internal memory; and inserting at least a portion of the native instructions into the internal memory at runtime based on the determined availability of internal memory and the runtime sensitivity determination.

2. The method of claim 1 wherein the application comprises a Java application with at least one Java class, each Java class including at least one bytecode.

3. The method of claim 1 wherein compiling at least a portion of the application into native instructions comprises passing the application through a just-in-time compiler, just-in-time compiler adapted to detect runtime sensitivity of the native instructions.

4. The method of claim 1 wherein the compiled application comprises a combination of bytecodes and native instructions.

5. The method of claim 1 wherein determining the runtime sensitivity comprises detecting a memory attribute code.

6. The method of claim 1 wherein determining the runtime sensitivity comprises analyzing a bytecode for memory addressing requirements and marking the analyzed bytecodes when the memory addressing requirements are extensive.

7. The method of claim 1 wherein inserting the native instructions into the internal memory comprises copying a set of instructions associated with the application from a flash memory to an internal random-access memory.

8. The method of claim 1 wherein the internal memory comprises an internal random-access cache memory.

9. The method of claim 1 further comprising:
adding de-referencing code to the compiled application, wherein the de-referencing code allows an application loader to insert a portion of the compiled application into the available internal memory prior to executing the application.

10. The method of claim 1 further comprising:
constructing a de-referencing table; and
attaching the de-referencing table to the compiled application, wherein the de-referencing table includes memory location information and memory size information associated with the portion of the native instructions to be inserted into the internal memory prior to executing the application.

11. The method of claim 1 further comprising:
updating a pseudo-cache table, the pseudo-cache table including memory location information and memory size information associated with the portion of the native instructions inserted into the internal memory.

12. The method of claim 1 further comprising:
executing the compiled application.

13. The method of claim 1 further comprising:
relinquishing the internal memory having the inserted native instructions when the compiled application has been executed.

14. The method of claim 1 further comprising:
updating a pseudo-cache location indicator, the pseudo-cache location indicator including an address of an available pseudo cache allocated to the inserting of the native instructions at runtime.

15. The method of claim 1 further comprising updating a pseudo-cache size indicator, the pseudo-cache size indicator including a number of bytes available in a pseudo cache.

16. A computer storage medium including a program to allocate memory in a wireless communication system, comprising: computer program code to load an application into a wireless communication device; computer program code to compile at least a portion of the application into native instructions; computer program code to determine a runtime sensitivity of the native instructions; computer program code to determine availability of internal memory; and computer program code to insert at least a portion of the native instructions into the internal memory at runtime based on the determined availability of internal memory and the runtime sensitivity determination.

17. The computer storage medium of claim 16 wherein computer program code to compile at least a portion of the application into native instructions comprises computer program code to pass the application through a just-in-time compiler, the just-in-time compiler adapted to detect runtime sensitivity of the native instructions.

18. The computer storage medium of claim 16 further comprising: computer program code to add de-referencing code to the compiled application, wherein the de-referencing code allows an application loader to insert a portion of the compiled application into the available internal memory prior to executing the application.

19. The computer storage medium of claim 16 further comprising: computer program code to construct a de-referencing table; and computer program code to attach the de-referencing table to the compiled application, wherein the de-referencing table includes memory location information and memory size information associated with the portion of the native instructions to be inserted into the internal memory prior to executing the application.

20. The computer usable storage medium of claim 16 further comprising: computer program code to update a pseudo-cache table, the pseudo-cache table including memory location information and memory size information associated with the portion of the native instructions inserted into the internal memory.

21. The computer storage medium of claim 16 further comprising: computer program code to execute the compiled application.

22. The computer storage medium of claim 16 further comprising: computer program code to relinquish the internal memory having the inserted native instructions when the compiled application has been executed.

23. The computer storage medium of claim 16 further comprising: computer program code to update a pseudo-cache location indicator, the pseudo-cache location indicator including an address of an available pseudo cache allocated to the inserting of the native instructions at runtime.

24. The computer storage medium of claim 16 further comprising: computer program code to update a pseudo-cache size indicator, the pseudo-cache size indicator including a number of bytes available in a pseudo cache.

25. A wireless communication device, comprising a processor with: means for loading an application into the wireless communication device; means for compiling at least a portion of the application into native instructions; means for determining a runtime sensitivity of the native instructions; means for determining availability of internal memory; and means for inserting at least a portion of the native instructions into the internal memory at runtime based on the determined availability of internal memory and the runtime sensitivity determination.

26. The device of claim 25 further comprising:
means for adding de-referencing code to the compiled application, wherein the de-referencing code allows an application loader to insert a portion of the compiled application into the available internal memory prior to executing the application.

27. The device of claim 25 further comprising:
means for constructing a de-referencing table; and means for attaching the de-referencing table to the compiled application, wherein the de-referencing table includes memory location information and memory size information associated with the portion of the native instructions to be inserted into the internal memory prior to executing the application.

28. The device of claim 25 further comprising:

means for updating a pseudo-cache table, the pseudo-cache table including memory location information and memory size information associated with the portion of the native instructions inserted into the internal memory.

29. The device of claim 25 Anther comprising:

means for executing the compiled application.

30. The device of claim 25 further comprising:

means for relinquishing the internal memory having the inserted native instructions when the compiled application has been executed.

31. The device of claim 25 further comprising:

means for updating a pseudo-cache location indicator, the pseudo-cache location indicator including an address of an available pseudo cache allocated to the inserting of the native instructions at runtime.

32. The device of claim 25 further comprising:

means for updating a pseudo-cache size indicator, the pseudo-cache size indicator including a number of bytes available in a pseudo cache.

* * * * *